No. 808,479. PATENTED DEC. 26, 1905.
H. S. RIDDLE.
ART OF AND APPARATUS FOR HEATING AND VULCANIZING, &c.
APPLICATION FILED JUNE 22, 1904.
2 SHEETS—SHEET 2.
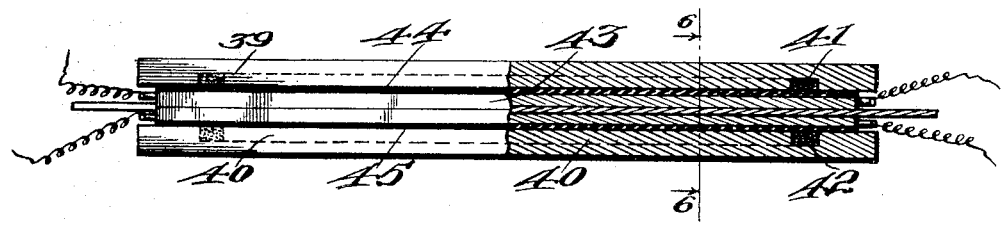
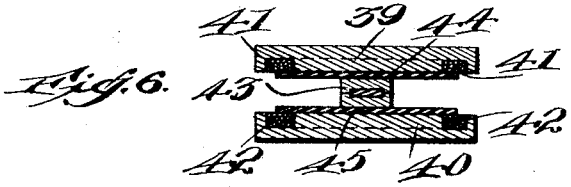
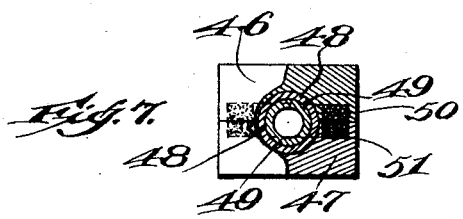
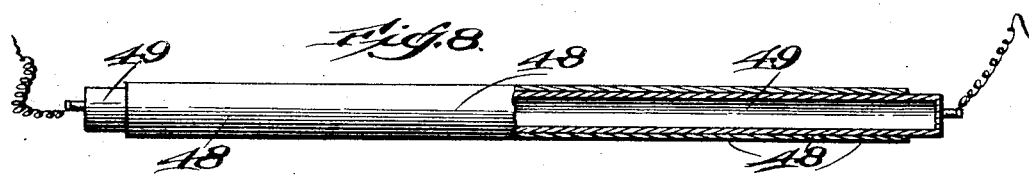
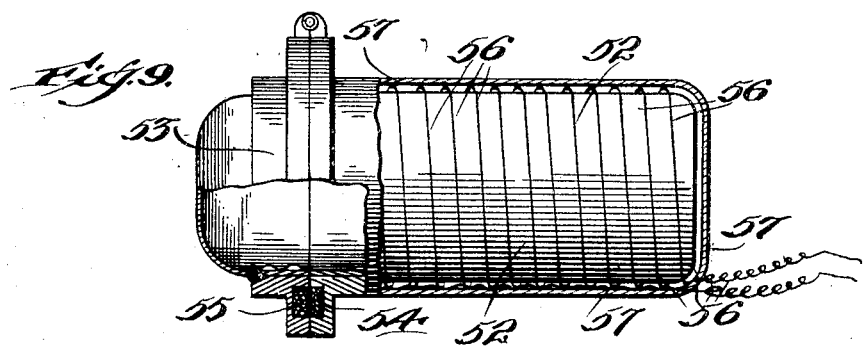
Witnesses
Howard S. Riddle, Inventor
By his Attorney Wm. B. Whitney

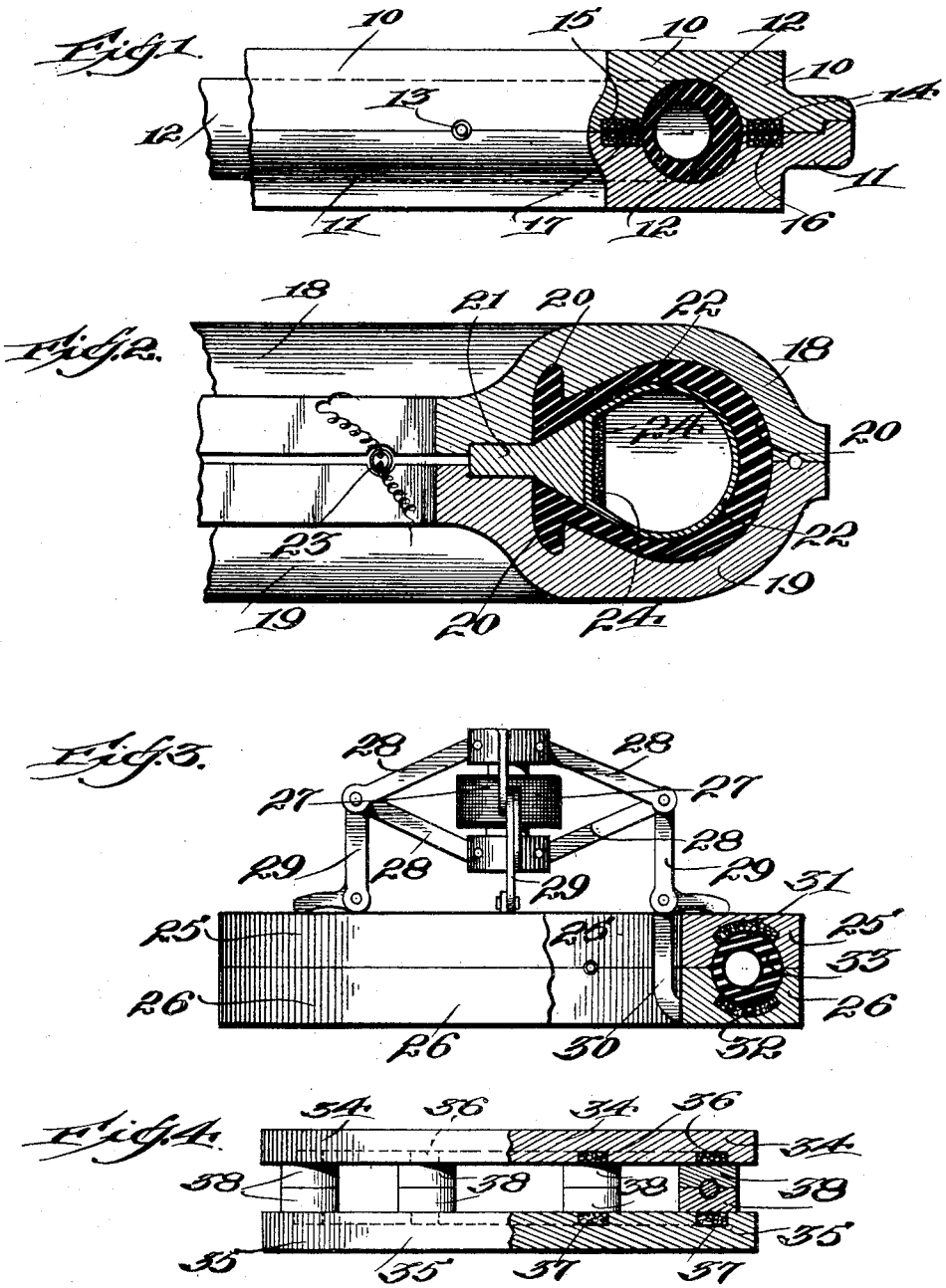

UNITED STATES PATENT OFFICE.

HOWARD S. RIDDLE, OF AKRON, OHIO.

ART OF AND APPARATUS FOR HEATING AND VULCANIZING, &c.

No. 808,479.        Specification of Letters Patent.        Patented Dec. 26, 1905.

Application filed June 22, 1904. Serial No. 213,599.

*To all whom it may concern:*

Be it known that I, HOWARD S. RIDDLE, a citizen of the United States, residing in the city of Akron, in the county of Summit and State of Ohio, have invented certain new and useful improvements in the art of and apparatus for heating and vulcanizing and closing and heating a plural-part vulcanizer or other forming or heating device, of which the following is a specification.

The invention relates to the art of and to apparatus for heating and also drawing together the parts or members and closing and heating a plural-part heater, whether a press, mold, or other compressing, shaping, or forming device, or simply a containing device or oven; and it relates more particularly to processes and apparatus for vulcanizing rubber, rubber compounds, and other vulcanizable substances and articles made therefrom, although, as stated, it is much broader in its scope and is equally adapted to a great variety of other uses.

The ordinary processes of vulcanization as heretofore and at present practiced are as follows: An article is roughly formed or shaped in any suitable manner and is then placed in a mold, the members of which are bolted or otherwise mechanically brought and clamped together to compress the rubber and further shape or mold the article. The mold, with the article thus compressed therein, is then conveyed to and inclosed within a vulcanizing oven or heater and is there subjected to the action of steam under pressure sufficient to obtain the required temperature until the heat and pressure have conjointly effected the desired vulcanization. In the case of certain hollow or tubular articles, such as pneumatic wheel-tires, the article is inflated in the mold by the introduction of compressed air or other gas, either directly or by means of a suitable bag, as in the case of tires of the "clencher" type, or by injecting therein a small quantity of water or other suitable liquid, the heat subsequently applied acting to vaporize the water or expand the compressed gas to further compress the rubber walls of the article against the inner surfaces of the mold. With rubber hose and tubing and with a variety of small articles, however, the vulcanization is effected without the aid of a mold, the hose being formed in suitable lengths on cylindrical mandrels which are run into long steam-chambers or are heated by forcing steam through the tubular mandrels themselves, while the other articles referred to are placed directly in the steam oven or heater; but rubber thus vulcanized without compression is apt to be soft and spongy and of inferior quality.

The operations above detailed are comparatively slow, and where the business is carried on upon a large scale the plant is not only expensive, but requires a large amount of floor-space.

The object of my invention is to simplify and cheapen the apparatus used in vulcanizing, to render the process more expeditious, and to effect a saving in the floor-space required therefor.

A further object is to provide improved means and methods for closing and clamping, for heating, and also for both closing and heating a heating apparatus or body, whether a press, mold, or other shaping or forming device or a simple oven or heater.

My invention consists, broadly stated, in the application of an electric current or currents both to magnetize, and thereby attract, draw together, and securely hold its parts or members, and also to heat a forming or heating device, or to effect either of these objects, the other being omitted or effected by other means, and more especially in the application of such current or currents to close magnetically and to heat electrically the molds, mandrels, and ovens used in vulcanizing rubber, thus doing away with all bolts and other mechanical clamping devices and with the costly steam plant and the apparatus required for handling heavy molds and moving them to and from the steam-ovens and effecting an economy both in the time and the space required for operating such apparatus.

A direct or continuous current of electricity is more efficient for magnetizing purposes and may also be employed to heat, as by passing it through a coil or coils of wire of a size to offer resistance to its passage or when of a pulsating character by the setting up of fields of varying magnetic density and the consequent induction of hysteresis effects and Foucault or eddy currents in the mass of magnetizable metal; but for heating I prefer to employ an alternating current, of single or polyphase, in a circuit so placed with respect to the forming or heating device that the passage of the current will set up alternating magnetic fields throughout the mass of magnetizable metal of which the former or heater is made, thus not only utilizing the heating effects of the more intense hysteresis and Foucault or eddy currents induced by such current, as well as any ohmic loss, but also obtaining a more uniform distribution of the heat in all parts of the forming or heating device. I therefore preferably make use of alternating currents of high periodicity when the object thereof is simply to heat, while a direct current will naturally be preferred for magnetizing purposes, and while it will of course be understood that a single current, either direct or alternating, may be so applied as to both magnetize and heat, my experiments lead me to believe that it is the better practice, where the former or heater is to be both closed and heated, to provide separate magnetic and heating circuits whenever practicable and to use a direct current in the former circuit and an alternating current in the latter. In vulcanizing rubber tires, for example, this allows the tire to be inflated after the mold has been closed and before the heating begins.

The forming or heating device may be made of any suitable shape, configuration, and size and of any suitable magnetizable metal, preferably soft steel or cast-iron, and the magnet and heating coil or coils may be arranged around the sides of its members or either their outer or inner surfaces, but preferably in or adjacent to the contact-faces, since magnet-coils will be found most efficient when so located, being placed for convenience in grooves and covered over with a covering of metal, if desired. In some cases a single coil will be found sufficient to both magnetize and heat the entire former or heater; but I prefer, especially in the case of molds of the size required for vulcanizing large wheel-tires, to provide each part or member with its own magnetic and heating coil or coils. Rubber tubing and similar articles which are formed upon mandrels may be dried or vulcanized, with or without the aid of an outer compression-mold, by placing the mandrel in an electric circuit and setting up therein a current or currents sufficient to heat the mandrel by direct ohmic loss or when an outer mold is used by closing and heating the mold in the manner above described. In a similar way molds of comparatively small cross-sectional area may be heated by placing them in and making them parts of suitable electric circuits and closing them between the members of a magnetic press or in any other suitable way, and a number of small molds may be placed between the members of a press and closed and heated by closing and heating the press members.

Several forms of apparatus embodying my invention and suitable for carrying into effect the art above described are illustrated in the accompanying drawings, in which—

Figure 1 is a vertical section of half of a two-part annular mold designed for molding, compressing, and vulcanizing "single-tube" pneumatic tires; Fig. 2, a similar section of a modified form of mold adapted for tires of the "clencher" type; Fig. 3, a partial elevation and partial vertical section of an annular mold provided with heating-coils and electromechanical means for closing the mold; Fig. 4, an elevation, partly in section, of a press designed for closing and heating one or more small molds; Fig. 5, a side elevation, partly in section, and Fig. 6 a section on line 6 6 of Fig. 5, of a modified form of press and mold; Fig. 7, an end view, partly in section, of a mold and mandrel for forming and vulcanizing hose, tubing, and similar articles; Fig. 8, a side view, partly in section, of the mandrel and section of tubing shown in Fig. 7; and Fig. 9, a side elevation, partly in section, of an oven or heater.

Referring to the mold, former, and heater illustrated in Fig. 1, the numerals 10 11 designate the two parts or members thereof formed with interior annular cavities, chambers, or seats opening to each other and adapted to receive, compress, and definitely shape and vulcanize a rubber tire 12, which may be first built up and roughly shaped on a mandrel or base and be removed therefrom and placed between the members of the mold. The usual valve-stem 13 of the tire extends through an aperture between the members of the mold. In this instance I have shown two resistance or magnothermal coils 14 15 arranged in grooves around the outer and inner contact-faces, respectively, of the upper mold member and two similar coils 16 17 arranged in like manner in and around the contact-faces of the lower mold member. The said coils are connected with a source of electric energy in any suitable way, either in series or parallel in the same circuit or in separate circuits, as found most convenient. To vulcanize the tire, it is only necessary to mount it in the mold and set up a suitable electric current or currents in the coils, having first injected a little water or other suitable volatile liquid through the valve and stem into the interior of the tire or immediately afterward inflating the tire with air or other gas. The electric current in the coils will magnetize and heat the mold, the heating being effected by ohmic loss when a direct current is employed and by hysteresis and Foucault or eddy currents in addition to ohmic loss if the current is an alternating one, thus attracting, drawing together, and holding in compression its members and compressing and molding the rubber between them, vaporizing the liquid or expanding the gas within the tire to further compress the rubber walls of the tire, and finally effecting the desired vulcanization. The proper degree of heat can be easily obtained and accurately maintained by simply regulating the amount or intensity of the electric current in the coils.

The numerals 18 19, Fig. 2, designate the counterpart members of a similar mold adapted for the vulcanization of a so-called "clencher" tire 20. An annular key piece or ring 21 separates the inner portions of the mold members and the flanges of the tire, which is inflated or compressed within the mold by means of an annular bag 22, preferably of rubber previously vulcanized, provided with a valve-stem 23, which extends out through an aperture in the key-piece. Here I have shown a single coil 24, designed for use with an alternating current, which, as shown, is arranged within and around the inflation-bag and with its ends projecting out through the valve-stem, although it is obvious that it might be arranged around the outside of the bag or in and around the outer circumference of the key-piece, if desired. An alternating current in the coil will both close and heat the mold by setting up rapidly-alternating magnetic fields and the attending hysteresis effects and Foucault or eddy currents in its two members and in the annular key-piece.

The members 25 26 of the mold shown in Fig. 3 are or may be closed and clamped by the electromagnet or solenoid 27, which is operatively connected by the toggle-levers 28 with a series of bell-crank levers 29, which are pivotally fulcrumed on arms 30, mounted on and fixed to the inner circumference of the lower mold member. When the magnet-coil of the solenoid is energized, it draws the core within the coil and brings together the diverging ends of each pair of toggle-levers, thus forcing outwardly the upper ends of the long arms of the bell-crank levers and causing their short arms to bear down on the upper surface of the upper mold member and forcing together, clamping, and holding its two members, and so closing the mold. In this case the two coils 31 32, which are mounted in grooves in and around the inner surfaces of the two mold members, respectively, and covered over with a covering of metal, so as to afford smooth molding-surfaces, are designed to be connected in a circuit of alternating currents and used primarily for heating the mold and the tire 33 by means of the hysteresis and Foucault or eddy currents which are set up in the members of the mold, while the coil of the solenoid is preferably energized by a direct current. It is obvious, however, that the coils may be used as magnothermal coils with a direct current, to heat and also to clamp the mold, either with or without the aid of the solenoid.

The press, Fig. 4, which comprises the two members 34 35 and the concentric or parallel coils 36 36 37 37 mounted in their inner surfaces and connected in a circuit or circuits, preferably of alternating currents, or, perhaps better, one coil in an alternating and the other in a direct current circuit, is designed to close and heat several small metallic molds 38, although it may be used equally as well to press and heat any other objects. A somewhat similar press is illustrated in Figs. 5 and 6 and comprises an upper plate or member 39, in and around the inner face of which is mounted a magnet-coil 41, and a lower member 40, with a magnet-coil 42 similarly mounted therein. This press is designed to close and clamp a two-part mold 43 of comparatively small cross-sectional area, which is insulated from the press by thin sheets 44 45, of asbestos, felt, or other suitable material, and may be heated by properly connecting the ends of its members in and as parts of an electric circuit and setting up therein a current or currents of an intensity sufficient to heat the mold by ohmic loss.

In Fig. 7 the two mold members 46 47 are designed for compressing and molding a section of rubber hose 48 or similar tubular articles formed on a mandrel 49 and placed therein. The coils 50 51, mounted, respectively, in and around the contact-faces of each of the mold members, may be utilized for heating as well as for magnetizing and closing said members either by ohmic loss with a direct current or with an alternating current by ohmic loss, hysteresis, and Foucault or eddy currents, or they may be used simply as magnet-coils, in which case or in case no compression-mold is employed the mandrel may be heated by ohmic loss by connecting its ends in and making it a part of a suitable electric circuit, as shown in Fig. 8, or in any suitable or convenient way.

A still further modification of my invention is shown in Fig. 9, in which 52 represents the body portion and 53 the door or cover of an oven or heater suitable for vulcanizing and other purposes. Magnet-coils 54 55 are arranged in grooves in and around the contact-faces of the body portion and door, respectively, and when energized serve to close and hold the door. A coil 56 surrounds the body portion and is designed to heat the oven by ohmic loss in case a direct current is used or by the hysteresis effects and Foucault or eddy currents which are set up in the body portion by the alternating magnetic fields induced therein when an alternating current is employed. A casing or outer wall 57 surrounds the body portion of the oven.

I wish it to be understood that in and by the term "former" or "forming device" as used in the foregoing specification and in the following claims I intend to include and cover a press, mold, or other shaping or forming device, and by the term "heater" I designate any heating device, whether a forming device or a mere containing device or oven.

Having now fully and clearly described my invention and explained the principle thereof and the best mode in which I contemplate applying that principle, what I claim as new, and desire to secure by Letters Patent, is.

1. The art of vulcanizing, which consists in placing the material to be vulcanized in a plural-part heater and applying the same electric energy to simultaneously close and heat said heater.

2. The art of vulcanizing, which consists in placing the material to be vulcanized in a plural-part heater and closing and heating said heater by setting up a suitable electric current or currents in a coil or coils located in or adjacent to one or more of its parts or members.

3. The art of vulcanizing, which consists in placing the material to be vulcanized in a plural-part heater and closing and heating said heater by setting up magnetic fields and hysteresis and Foucault or eddy currents in its parts or members.

4. The art of vulcanizing, which consists in placing the material to be vulcanized in a plural-part heater, closing said heater, and setting up alternating magnetic fields in its parts or members by passing suitable electric currents through a coil or coils located in or adjacent to and around one of more of said parts or members.

5. The art of vulcanizing, which consists in placing the material to be vulcanized in a plural-part heater, applying suitable electric energy to set up magnetic fields and hysteresis and Foucault or eddy currents in its parts or members, and applying supplemental electric energy to more securely close said heater and compress the material therein.

6. The art of vulcanizing, which consists in placing the material to be vulcanized in a plural-part heater and closing and heating said heater by electrically energizing one or more magnothermal coils suitably located and connected with respect thereto.

7. The art of vulcanizing, which consists in placing the material to be vulcanized in a mold, electrically energizing one or more magnet-coils, suitably located and arranged, to close said mold, and heating said mold by setting up alternating magnetic fields in its parts or members.

8. The art of vulcanizing, which consists in placing a hollow object in a mold, closing and heating said mold by setting up magnetic fields and hysteresis and Foucault or eddy currents therein, and subjecting the walls of said object to gas-pressure during the heating of the mold.

9. The art of vulcanizing, which consists in placing a hollow object in a mold, closing and heating said mold by setting up alternating magnetic fields therein, and causing the vaporization of a liquid within said hollow object.

10. The art of vulcanizing, which consists in placing the material to be vulcanized in a plural-part heater, closing said heater by the application of electric energy to magnetize its parts or members, and heating said heater.

11. The art of vulcanizing, which consists in placing the material to be vulcanized in a plural-part heater, closing said heater by the application of an electric current to energize a magnet coil or coils placed in or adjacent to the contact-face of one or more of its parts or members, and heating said heater.

12. The art of vulcanizing, which consists in placing the material to be vulcanized in a plural-part heater, closing said heater to shut in and inclose the material therein, and heating said heater by hysteresis and Foucault or eddy currents set up therein by the application of suitable electric energy in a coil or coils located in or adjacent to and around one or more of its parts or members.

13. The art of vulcanizing, which consists in placing the material to be vulcanized in or around a body of suitable material and setting up hysteresis and Foucault or eddy currents in said body by the application of suitable electric energy in one or more coils located in or adjacent to and around said body.

14. The art of vulcanizing, which consists in placing the material to be vulcanized around a mandrel or other former, of suitable material, and heating said mandrel or former by setting up a suitable electric current or currents therein.

15. The art of heating, which consists in applying the same electric energy to simultaneously close and heat a plural-part heater.

16. The art of heating, which consists in closing and heating a plural-part heater by setting up a suitable electric current or currents in a coil or coils located in or adjacent to one or more of its parts or members.

17. The art of heating, which consists in closing and heating a plural-part heater by setting up magnetic fields and Foucault or eddy currents in its parts or members.

18. The art of heating, which consists in closing and heating a plural-part heater by setting up alternating magnetic fields in its parts or members.

19. The art of heating, which consists in applying suitable electric energy to set up magnetic fields and hysteresis and Foucault or eddy currents in the parts or members of a plural-part heater, to close and heat said heater, and applying supplemental electric energy to more securely close said heater.

20. The art of heating, which consists in closing and heating a plural-part heater by electrically energizing one or more magnothermal coils suitably located and arranged with respect thereto.

21. The art of heating, which consists in applying electric energy to magnetize the parts or members and close a plural-part heater, and in heating said heater.

22. The art of heating, which consists in applying an electric current to energize a magnet coil or coils placed in or adjacent to the contact-face of one or more of its parts or members, to close a plural-part heater, and in heating said heater.

23. The art of forming and heating, which consists in applying a suitable electric current or currents to energize one or more magnet-coils, suitably located and arranged to operate and heat a plural-part-forming device.

24. The art of forming and heating, which consists in applying the same electric energy to simultaneously close and heat a plural-part-forming device.

25. The art of forming and heating, which consists in setting up magnetic fields and hysteresis and Foucault or eddy currents in the parts or members of a plural-part-forming device, to close and heat said forming device.

26. The art of molding and heating, which consists in applying the same electric energy to simultaneously close and heat a plural-part mold.

27. The art of molding and heating, which consists in placing the material to be operated upon in a plural-part mold and setting up in its parts or members magnetic fields to close and alternating magnetic fields to heat said mold.

28. In an electric heater for vulcanizing or other purposes, a body portion of suitable material, one or more coils suitably located in or adjacent to and around said body portion, and means for setting up an electric current or currents in said coil or coils suitable to set up hysteresis and Foucault or eddy currents in said body portion.

29. In a plural-part heater for vulcanizing or other purposes, means for applying the same electric energy to both close and heat said heater.

30. In a plural-part heater for vulcanizing or other purposes, means for applying the same electric energy to simultaneously close and heat said heater.

31. In a plural-part heater for vulcanizing or other purposes, the combination with the parts of said heater of an electromagnet coil or coils adapted when energized to close said heater and of means for electrically heating said heater.

32. In a plural-part heater of magnetizable metal for vulcanizing or other purposes, an electromagnet coil or coils located in or adjacent to the contact-face of one or more of its parts or members, and means for heating said heater.

33. In a plural-part heater for vulcanizing or other purposes, means for closing said heater, and means for setting up hysteresis and Foucault or eddy currents throughout its several parts or members.

34. In a plural-part heater for vulcanizing or other purposes, means for closing said heater, and means for setting up alternating electric currents in a coil or coils located in or adjacent to and around one or more of its parts or members, to set up alternating magnetic fields in and thereby heat said parts or members.

35. In a plural-part heater for vulcanizing or other purposes, means for electrically energizing a magnet coil or coils, suitably located and arranged, to close said heater, and means for setting up alternating magnetic fields in its parts or members to heat said heater.

36. In a plural-part heater for vulcanizing or other purposes, a coil or coils suitably located in or adjacent to one or more of its parts or members, and means for applying electric energy in said coil or coils, to close and heat said heater.

37. In a plural-part heater for vulcanizing or other purposes, a magnothermal coil or coils to close and heat said heater when suitably energized.

38. In a plural-part heater for vulcanizing or other purposes, means for setting up magnetic fields and hysteresis and Foucault or eddy currents in its parts or members, to close and heat said heater.

39. In a plural-part heater for vulcanizing or other purposes, means for setting up alternating magnetic fields in its parts or members, to close and heat said heater.

40. In a plural-part heater for vulcanizing or other purposes, a body portion and door or cover, a magnet coil or coils located in or adjacent to the contact-faces of said body portion and door, and means for applying electric energy to heat said body portion.

41. In a plural-part heater for vulcanizing or other purposes, a body portion and door or cover, a magnet coil or coils located in or adjacent to the contact-faces of said body portion and door, and a coil or coils located in or adjacent to and around said body portion.

42. In a plural-part heater for vulcanizing or other purposes, a body portion and door or cover, a magnothermal coil or coils located in or adjacent to the contact-faces of said body portion and door and around said body portion.

43. In a plural-part heater for vulcanizing or other purposes, a body portion and door or cover, a magnet coil or coils located in or adjacent to the contact-faces of said body portion and door and around said body portion, and means for applying electric energy in said coil or coils to set up magnetic fields and hysteresis and Foucault or eddy currents in said body portion and door.

44. In a plural-part heater for vulcanizing or other purposes, means for setting up magnetic fields and hysteresis and Foucault or eddy currents in its parts or members to close and heat said heater, and supplemental means for applying electric energy to more securely close said heater.

45. A plural-part mold of magnetizable metal, and a magnothermal coil in or adjacent to the contact-face of one or more of its parts or members, to close and heat said mold.

46. A plural-part mold of magnetizable metal, a coil or coils located in or adjacent to one or more of its parts or members, and means for setting up an electric current or currents in said coil or coils to set up hysteresis and Foucault or eddy currents in said parts or members.

47. A plural-part mold of magnetizable metal, a magnet coil or coils located and arranged to close said mold when suitably energized, and means for setting up alternating magnetic fields in its parts or members, to heat said mold.

48. A plural-part mold, a magnet coil or coils located in or adjacent to the contact-face of one or more of its parts or members, to close said mold, and means for applying electric energy to set hysteresis and Foucault or eddy currents in said parts or members.

49. A plural-part mold, means for applying an alternating electric current to close and heat said mold, and means for applying a direct electric current to supplement said alternating current in closing and clamping said mold.

50. A plural-part mold, a magnetic coil or coils located in or adjacent to the contact-face of one or more of its parts or members, and another coil or coils suitably located to set hysteresis and Foucault or eddy currents in said parts or members when suitably energized.

51. A plural-part mold, a magnet coil or coils located in or adjacent to the contact-face of one or more of its parts or members, another coil or coils located in or adjacent to one or more of said parts or members, and means for setting up direct electric currents in said magnet-coils and alternating electric currents in said other coils.

52. A plural-part mold, a core within said mold, and means for applying electric energy to heat said core.

53. A plural-part mold, a core within said mold, and means for applying electric energy to close said mold and to heat said core.

54. A plural-part mold, an annular chamber therein and a magnet coil or coils within said chamber.

55. A plural-part mold, consisting of annular members and an annular key-piece, and means for setting up hysteresis and Foucault or eddy currents in said members and key-pieces.

56. A plural-part mold, consisting of annular members and an annular key-piece, and means for setting up alternating magnetic fields in said members and key-pieces.

57. A forming device, consisting of a press, a magnet coil or coils located and arranged to close said press when suitably energized, and a coil or coils of electric conductor located in or adjacent to the members of said press to heat said press when suitably energized.

58. A vulcanizer, consisting of a press and mold, and means for applying electric energy to magnetize the members of said press and close said press and mold and to heat said mold.

59. A vulcanizer, consisting of a press and mold, and means for applying electric energy to magnetize the members of said press and to set up hysteresis and Foucault or eddy currents in said mold.

60. A vulcanizer, consisting of a press and a mold between the members of said press, and means for applying the same electric energy, to simultaneously close said press and heat said mold.

61. A vulcanizer, consisting of a press and mold, of suitable material, means for closing the press members upon the mold and means for setting up hysteresis and Foucault or eddy currents in said press members and mold to heat said mold.

62. A vulcanizer, consisting of a press and mold, of suitable material, means for closing the press members upon the mold, a coil or coils of electric conductor located in or adjacent to one or both of said press members, and means for applying suitable electric energy in said coil or coils to set up alternating magnetic fields in said press members and mold.

63. A vulcanizer, consisting of a press and mold, of suitable material, lever mechanism connected with one or both of the press members and operated by an electro magnet or magnets for closing said press members upon the mold, a coil or coils of electric conductor located in or adjacent to one or both of said press members, and means for applying suitable electric energy in said coil or coils to set up hysteresis and Foucault or eddy currents in said press members.

64. A vulcanizer, consisting of a mold of magnetizable metal having a suitable cavity therein, means for closing the mold to compress the material in said cavity, a coil or coils of electric conductor in or adjacent to the walls of the mold, and means for setting up alternating electric currents in said coil or coils to heat the mold.

65. A vulcanizer, consisting of a mold of magnetizable metal having a suitable cavity therein, a coil or coils of electric conductor set into and around the mold, and means for applying suitable electric energy in said coil or coils to set up hysteresis and Foucault or eddy currents in the mold.

66. A vulcanizer, consisting of a body portion of magnetizable metal hollowed out to form a containing cavity or receptacle, a coil or coils of electric conductor surrounding said body portion and set into or adjacent to its walls, and means for setting up alternating electric currents in said coil or coils to heat said body portion.

In testimony whereof I have hereunto affixed my signature in the presence of two witnesses.

HOWARD S. RIDDLE.

Witnesses:
 JOHN F. WARD,
 JOHN W. WILSON.